United States Patent
Chiu et al.

(10) Patent No.: US 7,496,763 B2
(45) Date of Patent: *Feb. 24, 2009

(54) MEMORY STORAGE DEVICE WITH A FINGERPRINT SENSOR AND METHOD FOR PROTECTING THE DATA THEREIN

(75) Inventors: Li-Kuo Chiu, Taipei (TW); Ming-Shun Chen, Ji-An Township, Hualien County (TW); Mao Yuan Ku, Jubei (TW); Yng-Tsang Chen, Jubei (TW); Bruce C. S. Chou, Hsin Chu (TW)

(73) Assignees: Aimgene Technology Co., Ltd., Taipei County (TW); Solid State System Co., Ltd., Hsinchu (TW); Lightuning Tech. Inc., Hsinchu (TW)

( * ) Notice: Subject to any disclaimer, the term of this patent is extended or adjusted under 35 U.S.C. 154(b) by 815 days.

This patent is subject to a terminal disclaimer.

(21) Appl. No.: 10/998,722

(22) Filed: Nov. 30, 2004

(65) Prior Publication Data

US 2005/0144464 A1 Jun. 30, 2005

(30) Foreign Application Priority Data

Dec. 2, 2003 (TW) .............................. 92133887 A (51) Int. Cl.
*G06F 21/00* (2006.01)
(52) U.S. Cl. ........................ 713/186; 713/187; 726/5; 726/27; 382/115; 382/124
(58) Field of Classification Search ................. 713/186, 713/187; 726/27, 5; 382/115, 124
See application file for complete search history.

(56) References Cited

U.S. PATENT DOCUMENTS 4,582,985 A 4/1986 Lofberg (Continued)

FOREIGN PATENT DOCUMENTS

EP 0124079 A1 7/1984

(Continued)

OTHER PUBLICATIONS

Federal Information Processing Standards Publication 190; "Guideline For The Use Of Advanced Authentication Technology Alternatives" (FIPS PUB 190); Sep. 28, 1994; pp. 1-79.*

*Primary Examiner*—Carl Colin
(74) *Attorney, Agent, or Firm*—Muncy, Geissler, Olds & Lowe, PLLC (57) ABSTRACT

A memory storage device includes a host interface to be connected to a terminal host, a controller connected to the host interface, and a fingerprint sensor and a memory module both connected to the controller. The controller communicates with the terminal host by handshakes and causes the terminal host to automatically run a suitable driver and a suitable application program from the memory module to the terminal host. The terminal host receives an instruction from a user through the driver and the program and informs the controller to control the fingerprint sensor to read to-be-recognized fingerprint data of the user. The terminal host utilizes the application program to process and judge whether or not the to-be-recognized fingerprint data substantially matches with template fingerprint data stored in the memory module, and further enables a specific block of the memory module to be accessed by the terminal host according to a matching result.

17 Claims, 5 Drawing Sheets

U.S. PATENT DOCUMENTS

| | | | |
|---|---|---|---|
| 5,053,608 A * | 10/1991 | Senanayake | 235/380 |
| 5,229,764 A * | 7/1993 | Matchett et al. | 340/5.52 |
| 6,011,858 A * | 1/2000 | Stock et al. | 382/115 |
| 6,088,802 A | 7/2000 | Bialick et al. | |
| 6,167,517 A * | 12/2000 | Gilchrist et al. | 713/186 |
| 6,213,403 B1 | 4/2001 | Bates, III | |
| 6,572,014 B1 * | 6/2003 | Lambert | 235/380 |
| 6,775,776 B1 * | 8/2004 | Vogt et al. | 713/186 |
| 6,952,489 B1 * | 10/2005 | Angelo et al. | 382/124 |
| 7,114,051 B2 * | 9/2006 | Guu et al. | 711/173 |
| 7,197,168 B2 * | 3/2007 | Russo | 382/125 |
| 2002/0073340 A1 | 6/2002 | Mambakkam et al. | |
| 2002/0078367 A1 | 6/2002 | Lang et al. | |
| 2002/0172001 A1 | 11/2002 | Homer | |
| 2003/0005337 A1 | 1/2003 | Poo et al. | |
| 2004/0025031 A1 * | 2/2004 | Ooi et al. | 713/186 |
| 2004/0044897 A1 * | 3/2004 | Lim | 713/186 |
| 2004/0068669 A1 * | 4/2004 | Uchida | 713/202 |
| 2004/0128520 A1 * | 7/2004 | LaCous | 713/186 |

FOREIGN PATENT DOCUMENTS

| | | |
|---|---|---|
| GB | 2 387 933 A | 10/2003 |
| JP | 07191835 A | 7/1995 |
| JP | 2000194645 | 7/2000 |
| WO | WO-01/84494 A1 | 11/2001 |
| WO | WO-02/42887 A2 | 5/2002 |
| WO | WO-03003282 A1 | 1/2003 |

* cited by examiner

MEMORY STORAGE DEVICE WITH A FINGERPRINT SENSOR AND METHOD FOR PROTECTING THE DATA THEREIN

BACKGROUND OF THE INVENTION

1. Field of the Invention

The invention relates in general to a memory storage device and a method for protecting the data therein, and more particularly to a memory storage device with a fingerprint sensor and a method for protecting the data stored therein. The invention also correlates to the patent applications to the some of the inventors: (a) U.S. patent application Ser. No. 10/160,519 filed on Jun. 1, 2002, and entitled "METHOD FOR PARTITIONING MEMORY MASS STORAGE DEVICE"; (b) U.S. patent application Ser. No. 10/403,052, filed on Apr. 1, 2003, entitled "CAPACITIVE FINGERPRINT SENSOR," and published on Oct. 9, 2003 as U.S. 20030190061A1; (c) U.S. patent application Ser. No. 10/434,833, filed on May 13, 2003, entitled "PRESSURE TYPE FINGERPRINT SENSOR FABRICATION METHOD," and published on Nov. 20, 2003 as 20030215976A1; (d) U.S. patent application Ser. No. 10/414,214, filed on Apr. 16, 2003, and entitled "THERMO-ELECTRIC SENSOR FOR FINGERPRINT THERMAL IMAGING"; and (e) U.S. patent application Ser. No. 10/638,371, filed on Aug. 12, 2003, and entitled "CAPACITIVE MICRO PRESSURE SENSING MEMBER AND FINGERPRINT SENSOR USING THE SAME".

2. Description of the Related Art

The conventional method for protecting the personal data is often made by way of password protection. However, using the password to protect the personal data is troublesome because the user tends to forget the password and the password may also be dangerously cracked. Hence, the biometrics identification methods based on the biometrics data particular to the personal, such as the fingerprint, voice, signature, and iris, have been gradually developed in order to provide the more complete and effective data protection methods. The advantages are that the biometric feature is always kept on the user and the user does not need to memorize the feature, the biometric feature cannot be stolen, and the fingerprint biometrics feature protection method is strict and very convenient.

Recently, owing to the invention of the chip-type fingerprint sensor, the miniaturized electrical product incorporated with the fingerprint identification device becomes the technology that can be implemented. The associated technology can be found in the above-mentioned (b) to (e) patents. Thus, span personal applications, such as the portable electrical products with the fingerprint identification function, have been developed.

More particularly, the aspect of the storage medium protection is an important development item incorporated with the biometrics identification method. For example, U.S. Pat. No. 4,582,985 issued on Apr. 15, 1986 has disclosed a storage medium protection method, in which the personal data stored in the personal ID card device is protected by way of fingerprint authentication. The protected data stored in the card device can be outputted for the subsequent processing or authentication procedures only after the fingerprint identification procedure passes. The transversal dimension of this device is the same as that of the generally used credit card. This device, which is a completely independent fingerprint identification device because the fingerprint capture and identification are performed in the same device, includes a fingerprint sensor, an image processing and identification module, and a memory. Although the application object thereof is to prevent the personal credit card from being counterfeited, this device has a high price because the image processing and identification module needs a high-level microprocessor, such as a 32-bit RISC processor or DSP chip, in addition to the fingerprint sensor is needed, which causes the independent identification device not easy to be popularized.

U.S. Pat. No. 6,213,403 discloses a storage device having a fingerprint sensor and utilizing the PCMCIA interface to connect to the computer. Similarly, the concept of this device is almost the same as that of the '985 patent because this device is also an independent fingerprint identification device, which possesses the fingerprint capture and identification functions, and the data stored in the storage device can be accessed only when the fingerprint authentication passes. The only one difference therebetween is that the '403 patent utilizes a standard PCMCIA interface. Meanwhile, the card of the PCMCIA device is completely inserted into the computer slot. Consequently, the '403 patent has to expose the fingerprint sensor device for usage according to the complicated mechanism designs, which may increase the unstability and cost of the mechanism.

Similarly, EP124079A1 patent discloses the data protection concept of an independent fingerprint identification module, which is the same as the '985 and '403 patents except for that the communication interface of the '079 patent is the golden finger configuration that is for the SD card interface.

WO 02/42887A2 patent discloses the data protection concept of an independent fingerprint identification module, which is the same as the '985, '403, and '079 patents except for that the '887 patent utilizes the USB interface to communicate with the terminal system. This device is similar to the flash memory disk that is popular over the market, but this device has the independent fingerprint processing and identification module.

U.S. Patent publication number 2003/005337 discloses the data protection concept of an independent fingerprint identification module, which is the same as the '985, '403, and '079 patents, and utilizes the USB as the communication interface. Similarly, the device of '337 patent is also an independent fingerprint identification device.

GB2387933 patent also discloses an independent fingerprint identification device, which has a concept and device design almost similar to those of the '887 and '337 patents, wherein the fingerprint capture and identification are performed in the same device.

Heretofore, the prior arts have a common feature of providing an independent fingerprint identification device including a fingerprint sensor, and a fingerprint image processing and identification IC. Such a design is intuitive and easily implemented and there is no need to install the fingerprint application program in the terminal system and the convenience of plug-and-play function may be provided. However, the prior art devices have an important problem of the high prices because a fingerprint image processing and identification IC and its associated memory components have to be utilized. Usually, the IC is the 32-bit RISC (Reduced Instruction Set Computer) or DSP (Digital Signal Processor) so as to perform the fingerprint identification effectively. Consequently, the conventional portable storage device with a fingerprint sensor has the drawback of high cost.

In order to solve the high cost problem, it is preferred to utilize the microprocessor of the terminal system to execute the fingerprint image processing and identification so as to effectively reduce the cost. However, the prior arts had not definitely disclosed the solution to the method. The reason will be described in the following.

If the fingerprint image processing and identification works are to be transferred from the storage device to the microprocessor of the terminal system, the disclosed device must have the functions of causing the fingerprint application program, which includes the fingerprint image processing, identification and encrypting/decrypting sub-programs, and a fingerprint matching program, to be automatically run or executed in the terminal system so as to achieve the plug-and-play function and facilitate the usage in any other terminal system. The above-mentioned prior arts, however, do not provide this solution.

Alternatively, as shown in U.S. Patent Publication Number 2003/005337, it is possible to install the fingerprint processing and identification programs in the terminal system. Such a design, however, disables the user from using the device over various terminal systems, or the user has to spend time to laboriously install the driver and application programs first in the terminal systems before using. The conventional method is to provide an optical disk for storing the drivers for the memory and the drivers for the fingerprint sensor of the storage device so that the user can install the suitable drivers and enable the storage device to be used. In this case, each time when the computer systems are firstly set, the user has to carry the portable storage device together with the optical disk so that he or she can use the storage device in other computer systems. Although it is possible to download the driver through the network, it is not a convenient way because some computers cannot connect to the network.

Thus, it is an important subject of the invention to provide a storage device with a fingerprint sensor and a method for protecting the data therein. The first feature of this invention is to utilize the processor of the terminal system for the fingerprint process and identification. Thus, the hardware cost of the device can be greatly reduced, and the device may be popularized. The second feature of this invention is to provide a function of causing the driver and the fingerprint application program including the fingerprint matching program to be completely and automatically run without installing the driver and program in the terminal system first. Because the firmware of the USB controller, the fingerprint identification and processing software, and the associated APs (application programs) are integrated together, the invention device can be used in various terminal systems, especially the computer devices, having various operation systems in a plug-and-play manner and supporting various operation systems of various languages without installing any driver or identification software in the terminal systems first.

Meanwhile, the personal data is encrypted and then stored in the memory of the device, and the data format and content in the memory cannot be correctly acquired even though the memory is removed.

SUMMARY OF THE INVENTION

It is therefore an object of the invention to provide a memory storage device having a fingerprint sensor, wherein the memory storage device is connected to a terminal host and works together with the terminal host such that the cost of the storage device does not have to be greatly increased.

Another object of the invention is to provide a memory storage device having a fingerprint sensor, which can hide the fingerprint sensor and a memory of the device with respect to a terminal host so as to simplify the control method of the terminal host.

The invention achieves the above-identified objects by providing a memory storage device having a fingerprint sensor to be connected to a terminal host. The memory storage device includes a host interface to be connected to the terminal host, a controller connected to the host interface, a fingerprint sensor, which is connected to the controller and for sensing to-be-recognized fingerprint data of a user, and a memory module connected to the controller.

The controller divides the memory module into multiple disks. The operation is finished by the controller but not the host. Each of the disks is the real disk, but not the logic disk, with respect to the host. In addition, one of the disks further may be partitioned into multiple zones. Some of the zones may be freely accessed by all the terminal clients, and the rest of the zones only can be accessed by the assigned clients who pass through the identification. Thus, the data protection function may be achieved. The controller divides the memory module into three zones, which include a public block for storing a plurality of application programs, a private block for storing to-be-protected data, and a hidden block for storing template fingerprint data and an encryption key. Once the memory storage device is inserted into the host slot, the controller loads the data of the information block into the SRAM of the controller after the power is turned on. The controller is responsive to the request of the host to allocate the memory module and regard it as the logic disk according to the data of the information block, which is loaded into the SRAM. The host loads and executes the application program of the public block. The controller transmits the template fingerprint data to the host. The host accesses an instruction of the user through the logic disk data and receives the instruction through the application program so as to inform the controller to control the fingerprint sensor to read the to-be-recognized fingerprint data of the user, and to transfer the to-be-recognized fingerprint data to the host. The terminal host utilizes the application program to process the to-be-recognized fingerprint data and the template fingerprint data and judge whether or not both of them substantially match with each other. If yes, the private block is enabled to be accessed by the terminal host. If not, the private block is disabled from being accessed by the terminal host.

The template fingerprint data is created as follows. The controller communicates with the terminal host through the host interface, and causes the terminal host to automatically run one of the drivers and one of the application programs, both of which are suitable for the terminal host. The terminal host receives an instruction from an authorized user through the driver and the application program so as to inform the controller to control the fingerprint sensor to read the template fingerprint data of the authorized user and to transfer the template fingerprint data to the terminal host. The terminal host utilizes the application program to process the template fingerprint data and the processed data is then transmitted to and stored in the hidden block.

Other objects, features, and advantages of the invention will become apparent from the following detailed description of the preferred but non-limiting embodiments. The following description is made with reference to the accompanying drawings.

DETAILED DESCRIPTION OF THE INVENTION

The feature of the invention is to solve the above-mentioned conventional problems.

First, the invention device utilizes a microprocessor of a terminal system to execute the fingerprint image processing and identification procedures, which is different from the prior art device containing an independent fingerprint identification microprocessor. So, the cost is greatly reduced.

Second, although the invention device does not have the independent microprocessor, it can cause the fingerprint application program and the driver to be automatically run in the terminal system without the need of installing the program and driver in the terminal system first such that the invention device may be carried anywhere and conveniently plugged-and-played in different terminal systems.

Figure 1:
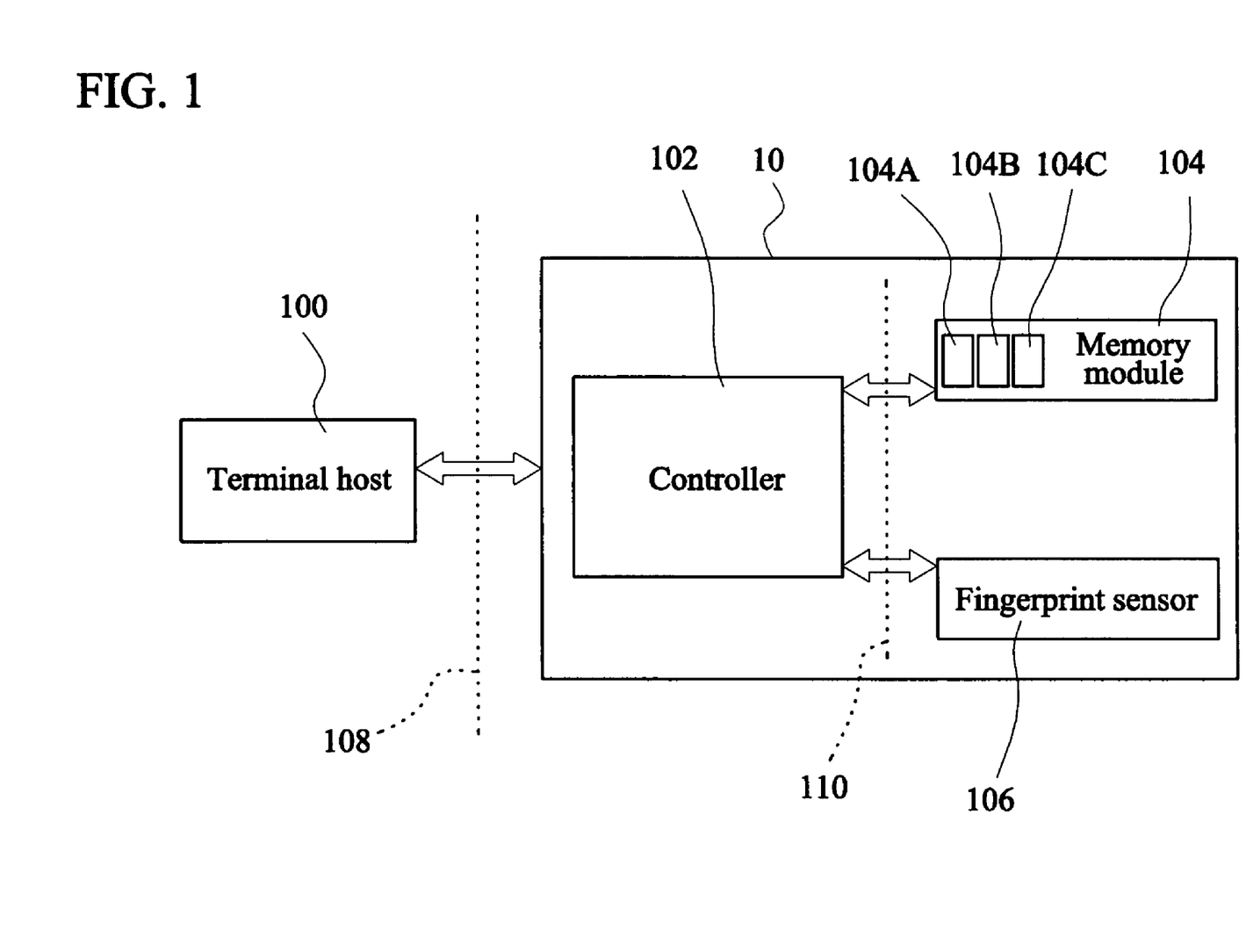
FIG. 1 is a schematic illustration showing a connection state between a terminal host and a memory storage device having a fingerprint sensor according to a first embodiment of the invention.

Referring to FIG. 1, a memory storage device 10 according to an embodiment of the invention includes a controller 102, a memory module 104, a fingerprint sensor 106 and a host interface 108. In this embodiment, the host interface is a USB (universal serial bus) interface. In other embodiments, however, the host interface also may be a PCMCIA interface, a PCI express interface, an IEEE 1394 interface or other standard interfaces. The USB interface 108 is connected to a terminal host 100, and the controller 102 is connected to the host interface such that the controller 102 is connected to the terminal host 100 through the host interface 108 and connected to the memory module 104 through a memory interface 110. The controller 102 is to communicate with the terminal host 100 and manage the memory module 104 and the fingerprint sensor 106 at the same time. The memory module 104 must include at least one storage chip or memory, such as a flash memory, a PROM (programmable read-only-memory), a ROM (read-only-memory) or an EEPROM (electrically erasable programmable read-only memory), for storing data. The memory module 104 is partitioned into a public block 104A for storing at least one application program containing a fingerprint matching program, a private block 104B for storing to-be-protected data, and a hidden block 104C for storing at least one template fingerprint data and an encryption/decryption key. The controller 102 can further transmit the encryption/decryption key to the terminal host 100 such that the application program of the terminal host 100 can encrypt/decrypt the to-be-protected data accessed from the private block 104B according to the encryption/decryption key.

The fingerprint sensor 106 may be a capacitive fingerprint sensor, a pressure type fingerprint sensor, a thermoelectric sensor, or a capacitive micro pressure fingerprint sensor, as described in the (b) to (e) patents. The sensor 106 may be an area-type fingerprint sensor for sensing a fingerprint of a stationary finger placed thereon, or a sweep-type fingerprint sensor for sensing a fingerprint of a finger sweeping thereacross. The fingerprint sensor 106 is controlled by the controller 102 in real time to capture the fingerprint data. The terminal host 100 compares the captured fingerprint data with the previously stored template fingerprint data, which is the fingerprint data of an owner enrolled into the memory storage device 10 when he or she uses this device at the first time. The fingerprint data serves as a comparison reference for the subsequent fingerprint data. Hence, the fingerprint sensor 106 is connected to the controller 102 and for sensing the template fingerprint data of an authorized user as well as to-be-recognized fingerprint data of a user for the comparison with the template fingerprint data.

Figure 2:
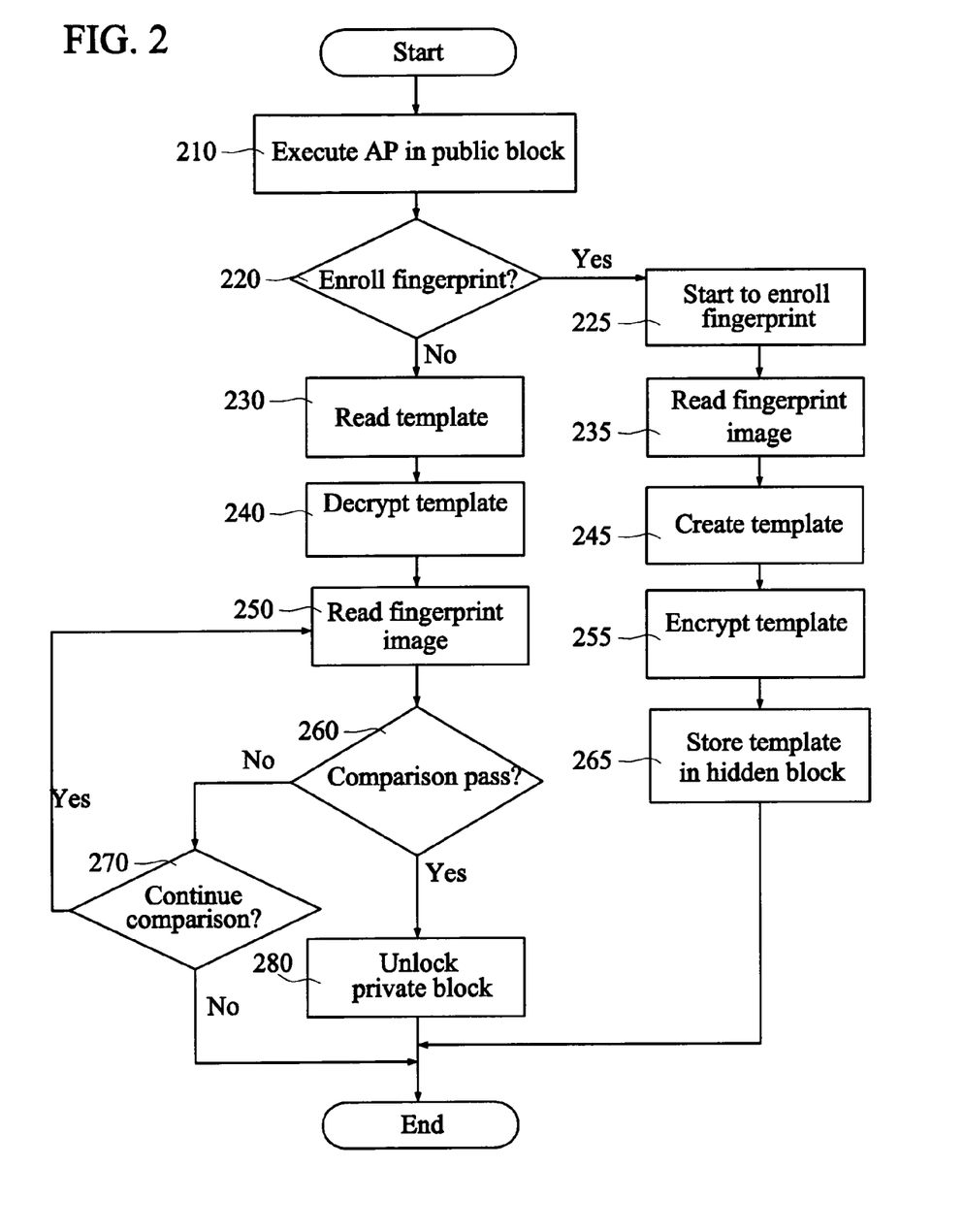
FIG. 2 is a flow chart showing a system applying the memory storage device with the fingerprint sensor.

As shown in FIG. 2, the invention method for protecting the data stored in the memory storage device 10 after the device 10 is connected to the terminal host 100 will be described in the following. First, the controller 102 communicates with the terminal host 100 through the host interface 108 and causes the terminal host 100 to automatically run the driver and fingerprint application program, which are suitable for the operation system of the terminal host 100, in the terminal host 100, as shown in step 210. In one embodiment, the technology to let the operation system of the terminal host 100 automatically run the fingerprint application program and driver is to simulate the public block 104A of the memory module 104 as a CD-ROM booting area. Then, in step 220, the terminal host 100 displays a window for the user to select or automatically judge to enter a fingerprint enrolling mode (step 225) or a fingerprint authentication mode (step 230).

When the fingerprint enrolling mode is to be entered, the terminal host 100 informs the controller 102 to control the fingerprint sensor 106 to read the template fingerprint data of the authorized user, and to transfer the template fingerprint data to the terminal host 100 (steps 235 and 245). At this time, the terminal host 100 utilizes the fingerprint application program to process the template fingerprint data and transmits the processed template fingerprint data to the hidden block 104C for storage. Alternatively, the fingerprint application program can utilize the key to encrypt the fingerprint template data (step 255), and then the encrypted template fingerprint data is transmitted to the hidden block 104C for storage (step 265).

When the fingerprint authentication mode is to be entered, the controller 102 reads the template fingerprint data (step 230) from the hidden block 104C such that the template fingerprint data can be transmitted to the terminal host 100, and then decrypts the fingerprint template data according to the key (step 240). Next, the terminal host 100 informs the controller 102 to control the fingerprint sensor 106 to read the to-be-recognized fingerprint data of the user, and to transfer the to-be-recognized fingerprint data to the terminal host 100 (step 250). Then, the terminal host 100 utilizes the application program to process the to-be-recognized fingerprint data and the template fingerprint data, and to judge whether or not both of them substantially match with each other. If yes, the private block 104B is unlocked and enabled to be accessed by the terminal host 100 (step 280). If not, the private block 104B is disabled from being accessed by the terminal host 100, or the terminal host 100 may ask the user whether or not he or she wants to continue the comparison for authentication (step 270).

Figure 3:
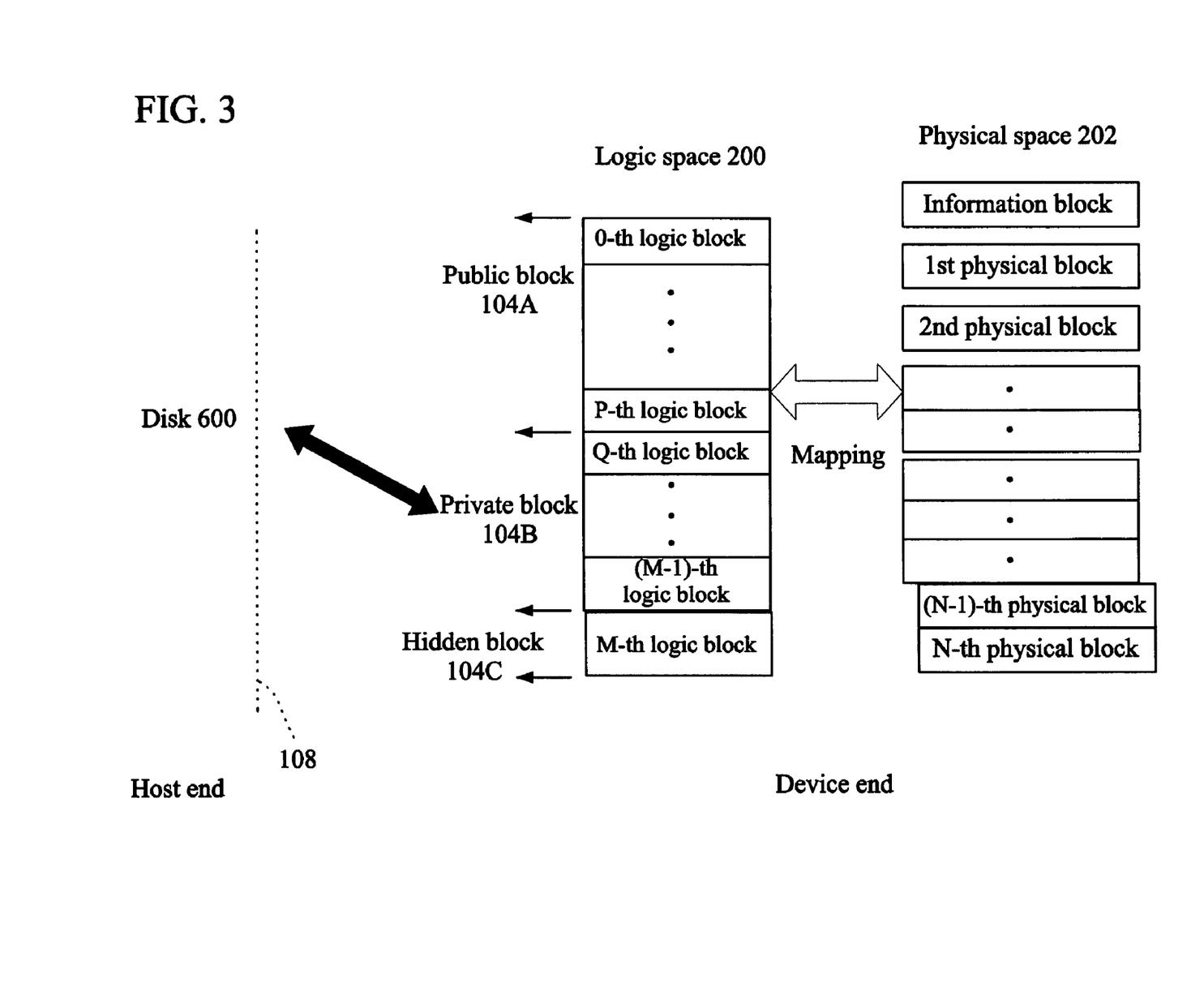
FIG. 3 is a schematic illustration showing that the memory module of the invention device is partitioned into various independent zones.

In brief, the controller 102 of the invention device manages the memory module 104 by partitioning the memory module into various independent blocks for storing different data. In this embodiment, for example, the memory module 104 is partitioned into a public block 104A, a private block 104B and a hidden block 104C. FIG. 3 is a schematic illustration showing that the memory module 104 of the invention device is partitioned into various independent zones.

As shown in FIG. 3, the controller 102 of the memory storage device 10 partitions a logic space 200 of the memory module 104 into three completely independent blocks, which include the public block 104A containing zeroth to P-th logic blocks, the private block 104B containing Q-th to (M-1)-th logic blocks, and the hidden block 104C containing the M-th logic block. The partitioning information is stored in a specific information block. The logic space 200 corresponds to a physical space 202, and the physical space 202 contains the information block and the first to N-th physical blocks.

In another embodiment, when the invention device is connected to the terminal system, the terminal system regards the device as an independent disk 600 and automatically links to the independent public block 104A in the memory module 104 so as to show the options menu of the fingerprint application program on the display device of the terminal system. Then, the user can select one of the options to execute the fingerprint application program. For example, a window for fingerprint matching may appear.

After the fingerprint application program of the public block 104A has been executed, the controller 102 automatically switches from the public block 104A to the private block 104B. Correspondingly, after the display device of the terminal system displays the frame switching to the protected private block 104B to show the protected data in the block, the user can access the data freely.

In brief, when the invention device is used, the controller 102 first switches to the public block to cause the terminal host to automatically run the fingerprint application program including the fingerprint matching program, and then switches to the private block after the fingerprint application program has been executed. Such a function of causing the fingerprint application including the fingerprint matching program to be automatically run and frame switching makes the invention different from the existing prior arts.

It is to be noted that the fingerprint application programs including the fingerprint matching program in the public block of the invention belong to the read-only files and cannot be seen and accessed.

In this invention, the hidden block 104C is also provided. This block has to communicate with the controller 102 directly through a special program, and the system cannot recognize the block. The space of the hidden block 104C may be adjusted according to the design condition. The hidden block stores the private data such as the template fingerprint data, the encryption key, the electrical certificate, and the like. It is also possible to set the size of the hidden block to zero according to the demand. In this case, the terminal system only displays the private block 104B and the public block 104A in the disk 600 mapping to the device.

Figure 4:
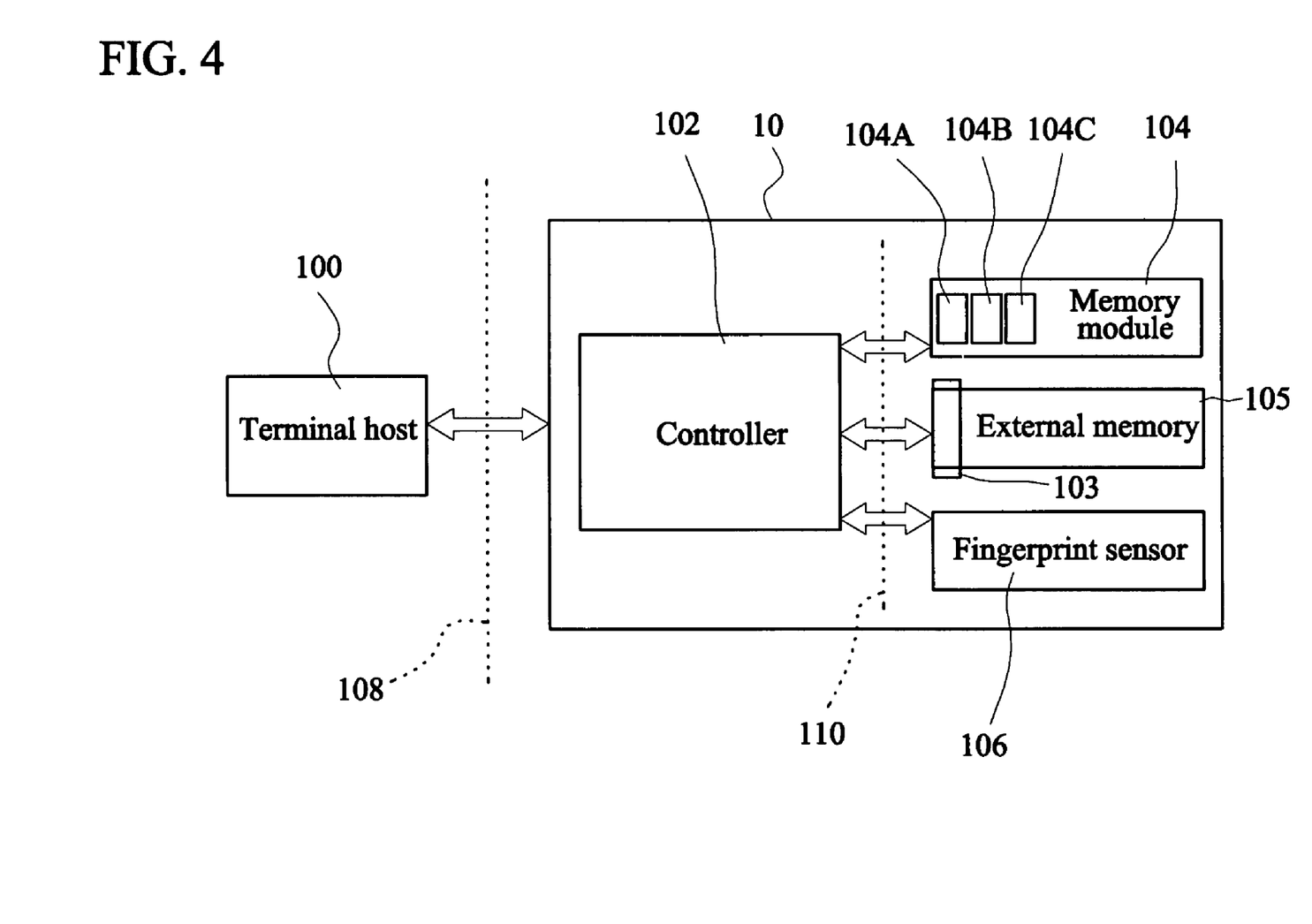
FIG. 4 is a schematic illustration showing a connection state between a terminal host and a memory storage device having a fingerprint sensor according to a second embodiment of the invention.

In another embodiment of the invention, as shown in FIG. 4, the memory storage device 10 includes a controller 102, a memory module 104, a fingerprint sensor 106 and a host interface 108, which are similar to those of FIG. 1, and further includes a storage expansion slot 103, which is substantially for expanding the storage space of the invention device. Alternatively, it is possible to regard the device as a card reader for an external memory 105, which may be, for example, the CF card, smart media (smart media) or memory stick or other external memories or HD (especially a one inch or smaller HD, also referred to as a microdrive) with the standard interface. The expansion slot 103 is electrically connected to the controller 102 through a memory interface 110, and is for being electrically connected to the external memory 105 so as to increase the memory capacity of the memory storage device. After the external memory 105 is inserted into the expansion slot 103, the controller 102 formats the external memory 105 into a single expansion private block for storing extra to-be-protected data. Consequently, the device can provide the data protection method for any external memory 105.

The system application flow of the invention will be described with reference to FIGS. 1 and 2 again.

First, the memory storage device 10 is inserted into a slot of the host 100, and the controller 102 communicates with the host 100 through the host interface 108 and loads the information block into the SRAM thereof after the power is turned on. The controller allocates the memory module 104 and regards it as a logic disk in response to the request of the host according to the information block data loaded into the SRAM. The host 100 loads and executes the application program stored in the public block 104A of the memory module 104. The operation is automatically performed under the control of the controller 102, and the user does not need to manually install the driver and the application program.

Then, the host 100 informs the controller 102 to control the fingerprint sensor 106 to read the template fingerprint data of the authorized user and to transfer the template fingerprint data to the host 100 by directly executing the application program and receives an instruction of the authorized user, wherein the instruction may be inputted using a pop-up window to guide the user.

Next, the host 100 utilizes the application program to process the template fingerprint data, and transmits the processed template fingerprint data to the hidden block 104C for storage. Then, the user can save the private data to the private block 104B.

When the user connects the memory storage device 10 to another host 100, the controller 102 communicates with the host 100 by handshakes through the host interface 108. Then, the controller 102 allocates the memory module 104, regards it as a logic disk, and automatically runs one of the application programs to the host 100 in response to the output request of the host 100. Thereafter, the application program of the host 100 judges that the template fingerprint data has been stored in the hidden block 104C of the memory module 104, or the controller 102 informs the host 100 the condition that the template fingerprint data has been stored in the hidden block 104C. In this case, the controller 102 transmits the template fingerprint data to the host 100. The host 100 informs the controller 102 to control the fingerprint sensor 106 to read and transfer the to-be-recognized fingerprint data to the host 100 by directly executing the application program and receiving an instruction of the user. The host 100 utilizes the application program to process the to-be-recognized fingerprint data and the template fingerprint data and to judge whether or not both of them substantially match with each other. If yes, the private block 104B is enabled to be accessed by the host 100. If not, the private block 104B is disabled from being accessed by the host 100.

In order to protect the private data in the private block 104B, it is possible to enable the application program to encrypt/decrypt the private data in the private block 104B according to the encryption key in the hidden block 104C. Under the control of the controller 102, the encryption/decryption key may be transmitted to the host 100. Therefore, the application program of the host 100 can encrypt/decrypt the to-be-protected data accessed from the private block 104B according to the encryption/decryption key.

Figure 5:
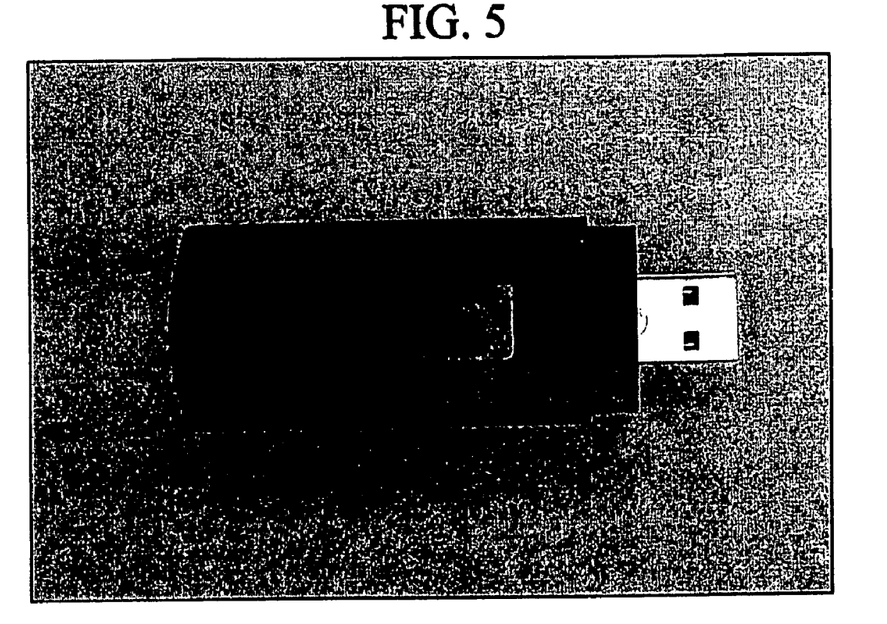
FIG. 5 shows the physical feature of a thumb disk with the invention device.
Figure 6:
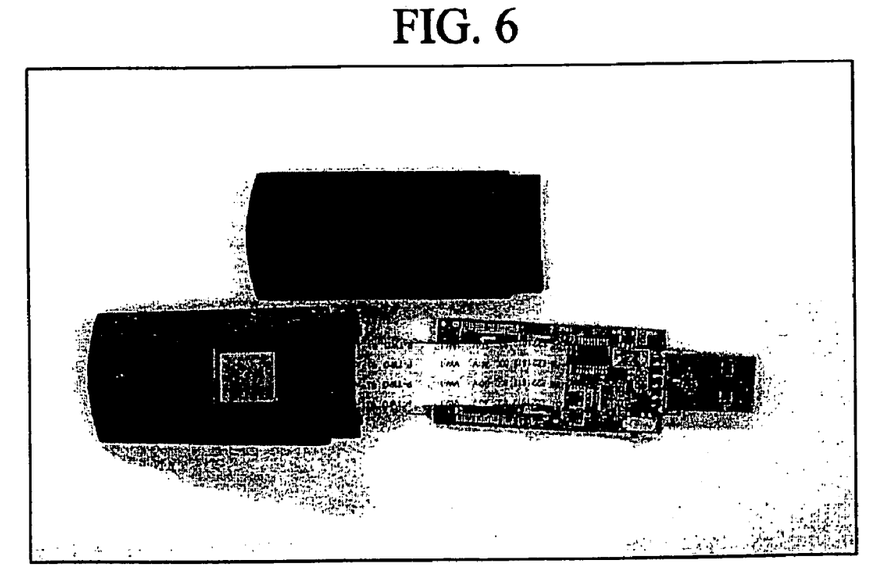
FIG. 6 is a physically exploded view showing the thumb disk of FIG. 5.

In order to prove that the invention can be implemented, a physical feature and a physically exploded view of a thumb disk with the invention device are respectively shown in FIGS. 5 and 6.

According to the construction of the invention, the connected device viewed from the computer system no longer includes a non-volatile memory and a fingerprint sensor, so it is unnecessary to install the drivers for the non-volatile memory and the fingerprint sensor, and the computer system does not need to control the operations of the devices in the multiplex way. Instead, the connected device viewed from the computer system only includes one portable storage device, so the computer system only has to control the operation of one device. The operations of the non-volatile memory and the fingerprint sensor in the portable storage device may be controlled by the controller. It is to be noted that the controller of the invention may broadly include the devices, such as a ROM and a RAM, for controlling the operations of the non-volatile memory and the fingerprint sensor.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A memory storage device to be connected to a terminal host, the memory storage device comprising:
   a host interface to be connected to the terminal host;
   a controller connected to the host interface;
   a fingerprint sensor, which is unremovably connected to the controller, for sensing to-be-recognized fingerprint data of a user; and
   a memory module unremovably connected to the controller and partitioned into:
      a public block for storing a plurality of application programs;
      a private block for storing to-be-protected data; and
      a hidden block for storing template fingerprint data, wherein:
   the controller communicates with the terminal host by handshakes through the host interface and causes the terminal host to automatically run one of the application programs, which is suitable for the terminal host;
   the controller transfers the template fingerprint data to the terminal host;
   the terminal host receives an instruction of the user through the application program and informs the controller to control the fingerprint sensor to read the to-be-recognized fingerprint data of the user and to transfer the to-be-recognized fingerprint data to the terminal host; and
   the terminal host utilizes the application program to process the to-be-recognized fingerprint data and the template fingerprint data, to judge whether or not the to-be-recognized fingerprint data substantially matches with the template fingerprint data, to enable the private block to be accessed by the terminal host if yes, and to disable the private block from being accessed by the terminal host if not.

2. The device according to claim 1, wherein the hidden block is further for storing an encryption/decryption key, and the controller can further transmit the encryption/decryption key to the terminal host.

3. The device according to claim 2, wherein the application program of the terminal host encrypts/decrypts the to-be-protected data, which is accessed from the private block, according to the encryption/decryption key.

4. The device according to claim 1, wherein the host interface is a universal serial bus (USB) interface, a PCMCIA interface, a PCI express interface or an IEEE 1394 interface.

5. The device according to claim 1, wherein the fingerprint sensor is an area-type fingerprint sensor or a sweep-type fingerprint sensor.

6. The device according to claim 1, further comprising:
   an expansion slot which is electrically connected to the controller and is to be electrically connected to an external memory in order to increase a memory capacity of the memory storage device.

7. The device according to claim 6, wherein after the external memory is inserted into the expansion slot, the controller formats the external memory into a single expansion private block for storing extra to-be-protected data.

8. A memory storage device to be connected to a terminal host, the memory storage device comprising:
   a host interface to be connected to the terminal host;
   a controller connected to the host interface;
   a fingerprint sensor, which is unremovably connected to the controller, for sensing template fingerprint data of an authorized user; and
   a memory module unremovably connected to the controller and partitioned into:
      a public block for storing a plurality of application programs;
      a private block for storing to-be-protected data; and
      a hidden block, wherein:
   the controller communicates with the terminal host through the host interface and causes the terminal host to automatically run one of the application programs, both of which are suitable for the terminal host;
   the terminal host receives an instruction coming from the authorized user through the application program so as to inform the controller to control the fingerprint sensor to read the template fingerprint data of the authorized user and to transfer the template fingerprint data to the terminal host; and
   the terminal host utilizes the application program to process the template fingerprint data and transmits the processed template fingerprint data to the hidden block for storage.

9. The device according to claim 8, wherein the hidden block is further for storing an encryption/decryption key, and the controller can further transmit the encryption/decryption key to the terminal host.

10. The device according to claim 9, wherein the application program of the terminal host encrypts/decrypts the to-be-protected data, which is accessed from the private block, according to the encryption/decryption key.

11. The device according to claim 8, wherein the host interface is a universal serial bus (USB) interface, a PCMCIA interface, a PCI express interface or an IEEE 1394 interface.

12. The device according to claim 8, wherein the fingerprint sensor is an area-type fingerprint sensor or a sweep-type fingerprint sensor.

13. The device according to claim 8, further comprising:
   an expansion slot, which is electrically connected to the controller and to be electrically connected to an external memory in order to increase a memory capacity of the memory storage device.

14. The device according to claim 13, wherein after the external memory is inserted into the expansion slot, the controller formats the external memory into a single expansion private block for storing extra to-be-protected data.

15. A method for protecting storage data in a memory storage device, which comprises: a host interface to be connected to a terminal host; a controller unremovably connected to the host interface; a fingerprint sensor, which is unremovably connected to the controller, for sensing template fingerprint data of an authorized user; and a memory module connected to the controller and partitioned into: a public block for storing a plurality of application programs; a private block for storing to-be-protected data; and a hidden block, wherein after the memory storage device is electrically connected to the terminal host, the protection method comprises the steps of:

enabling the controller to communicate wit the terminal host through the host interface, and enabling the terminal host to automatically run one of the application programs, one of the application programs which is suitable for the terminal host; and     entering a fingerprint enrolling mode or a fingerprint authentication mode, wherein in the fingerprint enrolling mode:

the terminal host informs the controller to control the fingerprint sensor to read the template fingerprint data of the authorized user, and to transfer the template fingerprint data to the terminal host; and         the terminal host utilizes the application program to process the template fingerprint data and transmits the processed template fingerprint data to the hidden block for storage; and     in the fingerprint authentication mode:

the controller transmits the template fingerprint data to the terminal host;

the terminal host informs the controller to control the fingerprint sensor to read to-be-recognized fingerprint data of the user and to transfer the to-be-recognized fingerprint data to the terminal host; and         the terminal host utilizes the application program to process the to-be-recognized fingerprint data and the template fingerprint data, judges whether or not the to-be-recognized fingerprint data substantially matches with the template fingerprint data, and enables the private block to be accessed by the terminal host if yes, or otherwise disables the private block from being accessed by the terminal host.

16. The method according to claim 15, wherein the hidden block is further for storing an encryption/decryption key, the controller transmits the encryption/decryption key to the terminal host, and the application program of the terminal host encrypts/decrypts the to-be-protected data, which is accessed from the private block, according to the encryption/decryption key.

17. The method according to claim 15, wherein the memory storage device further comprises an expansion slot, which is electrically connected to the controller and to be electrically connected to an external memory in order to increase a memory capacity of the memory storage device, and the method further comprises the steps of:

enabling the controller to format the external memory into a single expansion private block for storing extra to-be-protected data after the external memory is inserted into the expansion slot.

\* \* \* \* \*